US012774380B2

(12) United States Patent
Furuya et al.

(10) Patent No.: US 12,774,380 B2
(45) Date of Patent: Oct. 27, 2026

(54) RUBBER MOLDED BODY

(71) Applicants: SUBARU CORPORATION, Tokyo (JP); KINUGAWA RUBBER IND. CO., LTD., Chiba (JP)

(72) Inventors: Kazuhito Furuya, Tokyo (JP); Yasushi Morita, Tokyo (JP); Makoto Kawai, Tokyo (JP); Kazuyoshi Nojiri, Tokyo (JP); Asuka Shimizu, Tokyo (JP); Norihiro Harada, Chiba (JP); Osamu Tani, Chiba (JP); Keiichi Itou, Chiba (JP)

(73) Assignee: SUBARU CORPORATION; KINUGAWA RUBBER IND. CO., LTD., Chiba (JP)

( * ) Notice: Subject to any disclaimer, the term of this patent is extended or adjusted under 35 U.S.C. 154(b) by 450 days.

(21) Appl. No.: 18/415,233

(22) Filed: Jan. 17, 2024

(65) Prior Publication Data

US 2024/0247135 A1 Jul. 25, 2024

(30) Foreign Application Priority Data

Jan. 18, 2023 (JP) ................................ 2023-005750

(51) Int. Cl.

| | |
|---|---|
| ***C08L 9/00*** | (2006.01) |
| ***C08K 5/00*** | (2006.01) |
| ***C08K 5/20*** | (2006.01) |
| ***C08K 5/357*** | (2006.01) |
| ***C08K 5/40*** | (2006.01) |
| ***C08K 5/47*** | (2006.01) |
| ***C08L 91/06*** | (2006.01) |

(52) U.S. Cl.

CPC .............. *C08L 9/00* (2013.01); *C08K 5/0025* (2013.01); *C08K 5/20* (2013.01); *C08K 5/357* (2013.01); *C08K 5/40* (2013.01); *C08K 5/47* (2013.01); *C08L 91/06* (2013.01); *C08K 2201/014* (2013.01); *C08L 2205/02* (2013.01)

(58) Field of Classification Search

None

See application file for complete search history.

(56) References Cited

U.S. PATENT DOCUMENTS 5,518,819 A * 5/1996 Shibahara .............. B60G 11/20
174/152 R

FOREIGN PATENT DOCUMENTS

| | | | |
|---|---|---|---|
| JP | H06-100731 A | | 4/1994 |
| JP | 2002-265691 A | | 9/2002 |
| JP | 2006206788 A | * | 8/2006 |

OTHER PUBLICATIONS

JP2006206788 Global Dossier English translation, prepared Jun. 4, 2026. (Year: 2026).*

* cited by examiner

*Primary Examiner* — Christopher M Rodd

(74) *Attorney, Agent, or Firm* — Foley & Lardner LLP

(57) ABSTRACT

Disclosed is a rubber molded body formed from a rubber composition. The rubber composition contains a natural rubber and a butadiene rubber as predominant rubber components; a low-melting paraffin wax having a melting point of 45° C. to 57° C.; and optionally a low-melting fatty acid amide having a melting point of 35° C. to 85° C. The mass ratio of the natural rubber to the butadiene rubber ranges from 80/20 to 10/90. The amount of the low-melting paraffin wax contained in the rubber composition ranges from 20 to 70 parts by mass per 100 parts by mass of all rubber components. The total amount of the low-melting paraffin wax and the low-melting fatty acid amide contained in the rubber composition ranges from 30 to 100 parts by mass per 100 parts by mass of all rubber components.

7 Claims, 3 Drawing Sheets

RUBBER MOLDED BODY

BACKGROUND

The present invention relates to a rubber molded body, particularly of the type suitable for use in sliding contact with another member made of metal etc. The present invention more specifically relates to a rubber molded body suitably usable as a rubber molded product (such as a rubber bushing for an automotive vehicle) having an excellent abnormal noise suppression effect by maintaining good sliding characteristics even in a low-temperature atmosphere of e.g. −40° C. to 5° C. after long-term use.

Rubber molded bodies are often used as cushions between structural parts because of their elastic properties. For example, in the case of a rubber molded body applied to a place (such as door) where structural parts are in contact with each other, the rubber molded body is interposed between contact surfaces of the structural parts so as to prevent the structural parts from being damaged by contact therewith and maintain the desired functions of the structural parts. On the other hand, it is often the case that rubber molded bodies have high friction coefficients. There is thus a possibility of abnormal noise caused by sliding contact (friction) between the rubber molded body and its application part (such as another member made of metal etc.). In the case of an automotive rubber molded body (e.g. stabilizer bushing) adapted to receive therein a metal part and be secured within a mounting bracket which is attached to a vehicle body, there is a possibility of abnormal noise caused by a stick-slip phenomenon at a contact area between the rubber molded body and the mounting bracket during starting operation, sudden braking operation or left/right turning operation of the vehicle. Accordingly, it has been demanded to take any measure against the above-mentioned abnormal noise problems.

As one measure against the abnormal noise problems, it is conceivable to utilize rubber compositions containing lubricants such as fatty acid amides as raw materials for the production of rubber molded bodies. For instance, Japanese Laid-Open Patent Publication No. H6-100731 (hereinafter referred to as JP H6-100731A) proposes a self-lubricating rubber composition containing a lubricant so as to, when formed into a rubber molded body (vulcanized rubber body), allow blooming of the lubricant onto a surface of the rubber molded body for reduction of friction coefficient.

Furthermore, studies are being made on rubber compositions for automotive rubber molded bodies (e.g. stabilizer bushings) each capable of showing a significantly reduced friction coefficient at a surface of the rubber molded body in a wide temperature range of e.g. 10° C. to 50° C. so as to suppress abnormal noise caused by a stick-slip phenomenon in such a wide temperature range. For example, Japanese Laid-Open Patent Publication No. 2002-265691 (hereinafter referred to as JP 2002-265691A) proposes a rubber composition containing 2 to 25 parts by weight of a petroleum wax whose carbon number distribution has two peaks: one attributed to a low-molecular-weight component fraction with a carbon number maximum Cmax of $C_{24}$-$C_{29}$ and the other attributed to a high-molecular-weight component fraction with a carbon number maximum Cmax of $C_{32}$-$C_{38}$.

It is however known that the addition of a fatty acid amide to a rubber composition can lead to early start of vulcanization whereby the rubber composition becomes susceptible to scorching (premature vulcanization). In order to provide a rubber composition less susceptible to scorching and lower in sliding resistance, Japanese Laid-Open Patent Publication No. 2006-206788 (hereinafter referred to as JP 2006-206788A) proposes adding an «-olefin wax having a double bond at a molecular chain terminal thereof in place of the fatty acid amide.

SUMMARY

There is a possibility that the rubber molded body formed from any of the above-mentioned rubber compositions, when used in sliding contact with another member made of metal etc. (hereinafter occasionally referred to as "counterpart member") under a low-temperature atmosphere of e.g. −40° C. to 5° C. (in particular, under a low-temperature atmosphere after long-term use), cannot attain a sufficient effect of suppressing abnormal noise caused by a stick-slip phenomenon.

To be more specific, JP 2002-265691A gives no consideration to the melting point of the petroleum wax contained in the rubber composition. A microcrystalline wax used as the petroleum wax in Examples of JP 2002-265691A has a melting point of 60° C. or higher. Thus, the rubber molded body (such as stabilizer bushing) formed from the rubber composition of JP 2002-265691A may not attain a sufficient abnormal noise suppression effect in a relatively low-temperature atmosphere of e.g. 5° C. or lower.

Although it is described in JP 2006-206788A that the scorch time of the rubber composition can be varied with the addition of an α-olefin wax having a double bond at a molecular chain terminal thereof, JP 2006-206788A gives no consideration to the control of the scorch time depending on the kind and amount of a vulcanizing accelerator used. Further, J P 2006-206788A gives no consideration to the suppression of abnormal noise in a low-temperature atmosphere. Thus, the rubber molded body (such as stabilizer bushing) formed from the rubber composition of JP 2006-206788A may also not attain a sufficient abnormal noise suppression effect in a relatively low-temperature atmosphere.

The present invention has been made in view of the above-mentioned circumstances. It is an object of the present invention to provide a rubber molded body applicable as an automotive stabilizer bushing etc. capable of maintaining good sliding characteristics even under a low-temperature atmosphere of e.g. −40° C. to 5° C. (in particular, under a low-temperature atmosphere after long-term use) and thereby attaining a desired abnormal noise suppression effect under such a low-temperature atmosphere.

As a result of intensive research made to achieve the above object, the present inventors have found that, when a rubber composition for the production of a rubber molded body contains a natural rubber (NR) and a butadiene rubber (BR) as predominant rubber components and further contains a specific amount of a relatively low-melting paraffin wax and optionally a specific amount of a relatively low-melting fatty acid amide, the thus-produced rubber molded body attains a sufficient abnormal noise suppression effect even during sliding contact with a counterpart member in a low-temperature atmosphere. The present invention is based on this finding.

The present invention includes the following aspects.

According to one aspect of the present invention, there is provided a rubber molded body formed from a rubber composition, the rubber composition comprising: a natural rubber (NR) and a butadiene rubber (BR) as predominant rubber components; a low-melting paraffin wax having a melting point of 45 to 57° C.; and optionally a low-melting fatty acid amide having a melting point of 35 to 85° C., the mass ratio (NR/BR) of the natural rubber to the butadiene rubber ranging from 80/20 to 10/90, the amount of the low-melting paraffin wax contained in the rubber composition ranging from 20 to 70 parts by mass per 100 parts by mass of all rubber components, and the total amount of the low-melting paraffin wax and the low-melting fatty acid amide contained in the rubber composition ranging from 30 to 100 parts by mass per 100 parts by mass of all rubber components.

According to another aspect of the present invention, there is provided a rubber molded body as described above, wherein the mass ratio of the natural rubber to the butadiene rubber ranges from 40/60 to 15/85; the amount of the butadiene rubber contained in the rubber composition ranges from 50 to 85 parts by mass per 100 parts by mass of all rubber components; and the butadiene rubber has a cis-1,4 bond content of 90% or higher.

According to still another aspect of the present invention, there is provided a rubber molded body as described above, wherein the amount of the low-melting fatty acid amide contained in the rubber composition ranges from 10 to 40 parts by mass per 100 parts by mass of all rubber components.

According to yet another aspect of the present invention, there is provided a rubber molded body as described above, wherein the butadiene rubber has a Mooney viscosity ($ML_{1+4}$) of 50 to 75 at 100° C.; and the amount of the butadiene rubber contained in the rubber composition ranges from 50 to 90 mass % with respect to the total mass of the rubber composition.

According to still yet another aspect of the present invention, there is provided a rubber molded body as described above, wherein the rubber composition further comprises, as a vulcanization accelerator, at least one selected from the group consisting of tetrakis(2-ethylhexyl)thiuram disulfide, 2-(4'-morpholinodithio)benzothiazole and 4,4'-dithiodimorpholine in an amount of 0.5 to 10 parts by mass per 100 parts by mass of all rubber components.

The rubber molded body according to the present invention maintains good sliding characteristics even under a low-temperature atmosphere of e.g. −40° C. to 5° C. (in particular, even under a low-temperature atmosphere after long-term use) and attains a desired abnormal noise suppression effect under such a low-temperature atmosphere.

The other objects and features of the present invention will also become understood from the following description.

DETAILED DESCRIPTION

Figure 1:
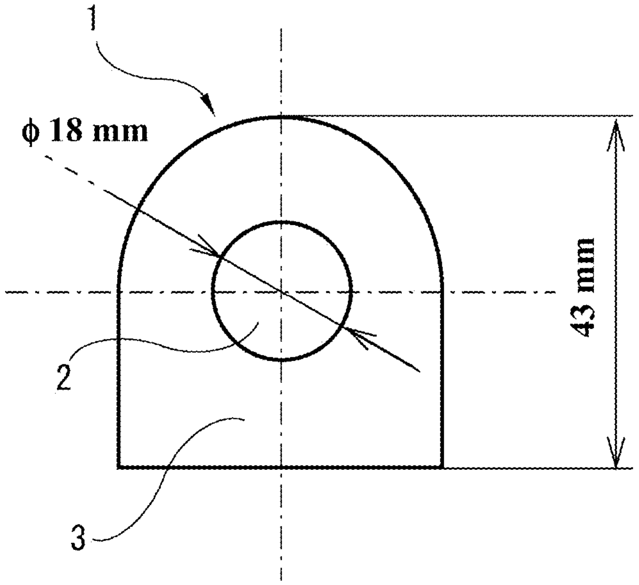
FIG. 1 is a front view of a stabilizer bushing as a rubber molded body according to one embodiment of the present invention.

Hereinafter, exemplary embodiments of the present invention will be described in detail below.

[Production of Rubber Molded Body]

A rubber molded body according to the present invention is produced from a rubber composition essentially containing a natural rubber (NR), a butadiene rubber (BR) and a low-melting paraffin wax having a melting point of 45 to 57° C. (hereinafter also simply referred to as "low-melting paraffin wax") and optionally containing a low-melting fatty acid amide having a melting point of 35 to 85° C. (hereinafter also simply referred to as "low-melting fatty acid amide") and other additives such as carbon black, vulcanizing agent, vulcanization accelerator, vulcanization aid etc. In the following description, the rubber molded body according to the present invention and the rubber composition as the raw material for the production of the rubber molded body according to the present invention are occasionally simply referred to as "rubber molded body" and "rubber composition", respectively, for the sake of convenience.

The rubber composition is prepared by mixing the constituent components with the use of a mixing machine such as pressure kneader, Banbury mixer, intermix mixer, open roll kneader or the like.

The rubber molded body is formed by molding and vulcanizing the rubber composition. The vulcanization conditions (such as vulcanization temperature and time) vary depending on the rubber composition and mixing machine used. The rubber molded body can be formed with desired elastic properties by, for example, vulcanizing the rubber composition at a vulcanization temperature of 145 to 170° C. for 3 to 60 minutes. Various molding machines are usable. It is feasible to obtain the rubber molded body by placing and compressing the rubber in a compression mold or by charging the rubber composition in a mold with the use of a transfer molding machine or injection molding machine and vulcanizing the rubber composition under pressure. Among others, injection molding is preferred in terms of high productivity with shortened vulcanization time etc.

A portion of the rubber molded body to be brought into sliding contact with a counterpart member (hereinafter simply referred to as a "sliding contact portion") is shaped according to the shape of the counterpart member. In the case where the counterpart member is in the form of a metal shaft, for example, the sliding contact portion of the rubber molded body is shaped to have an insertion hole into which the metal shaft as the counterpart member is inserted.

The rubber molded body according to the present invention is able to eliminate a deterioration of sliding characteristics caused due to a temperature environment or continuous use and effectively suppress an increase of friction resistance against the counterpart member, whereby abnormal noise such as stick-slip noise is prevented from being caused by sliding contact (friction) between the sliding contact portion of the rubber molded body and the counterpart member. It is therefore possible to, when the rubber molded body according to the present invention is applied as a rubber molded product such as anti-vibration rubber product for an automotive vehicle, solve the problem of a deterioration in vehicle ride comfort etc.

Figure 2:
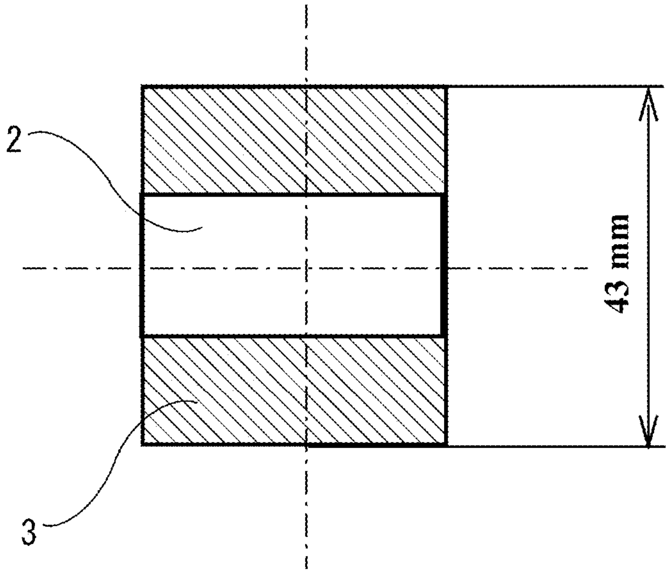
FIG. 2 is a cross-sectional view of the stabilizer bushing of FIG. 1.
Figure 3:
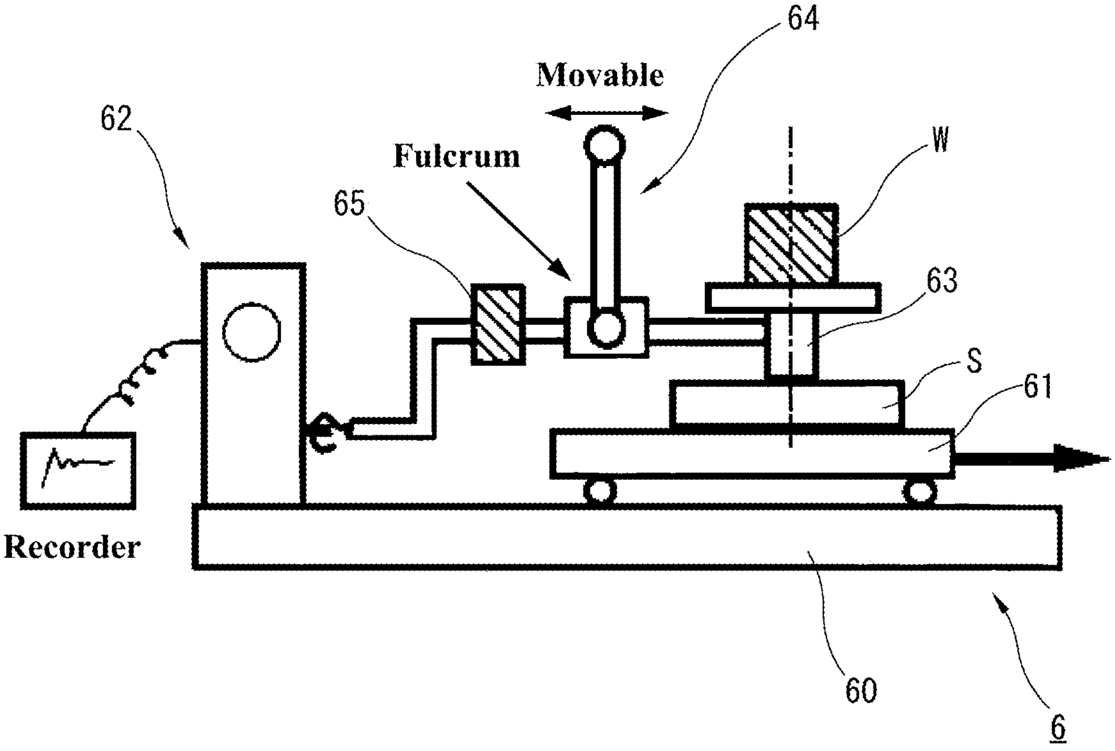
FIG. 3 is a schematic configuration view of a HEIDON's friction tester used for friction coefficient measurement in Examples.

FIGS. 1 and 2 show a stabilizer bushing 1 for an automotive vehicle as an example of the rubber molded body according to the present invention. As shown in FIGS. 1 and 2, the stabilizer bushing 1 includes a hollow portion (hole) 2 and a main body portion (rubber portion) 3. The hollow portion 2 is cylindrical in cross section such that a metallic stabilizer bar 4 (see FIG. 4) is inserted and held in the hollow portion 2. The main body portion 3 is formed in a cylindrical shape with a large thickness and is secured in a substantially U-shaped mounting bracket such that the stabilizer bushing 1 is attached to the vehicle body via the mounting bracket.

Since the stabilizer bushing 1 is used with the metallic stabilizer bar 4 fitted in the hollow portion 2, it is likely that abnormal noise will be caused by a stick-slip phenomenon under the action of a rotational force or frictional force on the contact area between the stabilizer bar 4 and the hollow portion 2 (the inner circumferential surface of the main body portion 3) of the stabilizer bushing 1 during starting operation, sudden braking operation or left/right turning operation etc. of the vehicle. However, the stabilizer bushing 1 is formed from the lubricating rubber composition as described in detail below. The lubricating component (such as paraffin wax) of the rubber composition becomes gradually deposited on the rubber surface of the stabilizer bushing 1 and functions as a self-lubricant. Thus, the stabilizer bushing 1 shows improved slidability against the stabilizer bar 4 and thereby suppresses the occurrence of abnormal noise.

In the case of a rubber molded body produced from an ordinary conventional lubricating rubber composition, the self-lubricating component is difficult to deposit on the rubber surface of the rubber molded body in a low-temperature atmosphere so that abnormal noise is likely to be caused due to a stick-slip phenomenon. Especially when the self-lubricating component is scraped off and lost by wearing of the rubber surface, abnormal noise is more likely to be caused due to a shortage of the self-lubricating component on the rubber surface.

On the other hand, the rubber molded body according to the present invention attains a sufficient abnormal noise suppression effect even in a low-temperature atmosphere by containing a relatively large amount of the specific low-melting wax component as the self-lubricant. Although the reason for the need to use a relatively large amount of the specific low-melting wax component is not certain, it is assumed that the abnormal noise suppression effect of the rubber molded body is influenced by adequate deposition of the wax component over a wide range of −40° C. to 5° C. and lubricity of the deposited wax component.

Next, the respective components of the rubber composition as the raw material for production of the rubber molded body according to the present invention will be explained below.

[Rubber Components]

In the rubber composition, both of the natural rubber (NR) and the butadiene rubber (BR) are contained as essential, predominant rubber components. When both of the natural rubber (NR) and the butadiene rubber (BR) are contained as the predominant rubber components, it means that the natural rubber and the butadiene rubber account for 90 mass % or more of all rubber components (that is, the total amount of the natural rubber and the butadiene rubber is 90 mass % or more).

In the present invention, the mass ratio (NR/BR) of the natural rubber to the butadiene rubber is in the range of 80/20 to 10/90. When the mass ratio NR/BR is in the range of 80/20 to 10/90, the rubber molded body attains a high abnormal noise suppression effect in a low-temperature atmosphere by deposition (blooming) of the low-melting paraffin wax onto the surface of the rubber molded part. Further, it is considered that, even when the low-melting paraffin wax bloomed onto the rubber surface is scraped off under continuous friction, an adequate amount of the low-melting paraffin wax is easily successively deposited out of the rubber molded part and bloomed onto the surface of the rubber molded part whereby the rubber molded body maintains its abnormal noise suppression effect. Preferably, the mass ratio NR/BR is in the range of 40/60 to 15/85. There is a tendency that it is easier to maintain the elastic properties of the rubber molded body in a lower-temperature atmosphere as the amount of the butadiene rubber contained in the rubber composition becomes larger. When the amount of the natural rubber contained in the rubber composition is too small, however, there may occur a deterioration of mixability (i.e. ease of compounding) during preparation of the rubber composition or may easily occur a breakage of the rubber molded body by repeated deformation due to a deterioration of rubber strength.

The rubber composition may contain any rubber component, other than the natural rubber and the butadiene rubber, in an amount of e.g. 10 mass % with respect to the total mass of all the rubber components. Examples of the other rubber component include a high styrene rubber for improvement of hardness and reduction of friction coefficient, a styrene-butadiene rubber (SBR) for improvement of processability, and the like. Also usable is a masterbatch in which rubber components are mixed with a vulcanization accelerator or sulfur for improvements of work environment and processability. There would be no problem even if the other rubber component such as ethylene-propylene-diene monomer (EPDM) is added in a small amount into the masterbatch.

As the butadiene rubber, it is preferable to use a butadiene rubber having a high cis-1,4 bond content (called a "high-cis butadiene rubber") in terms of low-temperature characteristics and durability (e.g. endurance against repeated deformation). The cis-1,4 bond content of the butadiene rubber is preferably 90% or higher, more preferably 93% or higher. Even in the case where such a high-cis butadiene rubber is used, the amount of the high-cis butadiene rubber contained in the rubber composition is set as appropriate. In this case, the amount of the high-cis butadiene rubber contained is preferably in the range of 50 to 85 parts by mass per 100 parts by mass of all the rubber components of the rubber composition.

Provided that the chemical composition of the butadiene rubber is the same, there is a tendency that the higher the molecular weight of the butadiene rubber, the higher the Mooney viscosity ($ML_{1+4}$) of the butadiene rubber, the higher the durability of the butadiene rubber. It is thus preferable that the butadiene rubber has a Mooney viscosity ($ML_{1+4}$) of 50 or higher at 100° C. On the other hand, there is a tendency that the higher the Mooney viscosity ($ML_{1+4}$) of the butadiene rubber, the lower the flowability of the butadiene rubber. Consequently, the rubber composition tends to deteriorate in mixability and moldability when the Mooney viscosity ($ML_{1+4}$) of the butadiene rubber becomes too high. It is thus preferable that the butadiene rubber has a Mooney viscosity ($ML_{1+4}$) of 75 or lower at 100° C. It is more preferable that the butadiene rubber has a Mooney viscosity ($ML_{1+4}$) of 65 or lower at 100° C. Even in the case where the butadiene rubber having a Mooney viscosity ($ML_{1+4}$) of 50 to 75 is used, the amount of the butadiene rubber contained in the rubber composition is set as appropriate. In this case, the amount of the butadiene rubber contained is preferably in the range of 50 to 90 mass % with respect to the total mass of the rubber composition.

Specific examples of the butadiene rubber include: those available from JSR Corporation under the tradenames of JSR BR-730, JSR BR-54 and JSR BR-740; those available from UBE Corporation under the tradenames of UBEPOL 390L; those available from ARLANXEO Corporation under the tradenames of BUNA-CB21, BUNA-CB22 and BUNA-CB1221; and the like.

[Wax Components]

In the rubber composition, the low-melting paraffin wax having a melting point of 45 to 57° C. is essentially contained in an amount of 20 to 70 parts by mass per 100 parts by mass of all the rubber components. With the use of such a low-melting paraffin wax, the rubber molded body attains a high effect of suppressing abnormal noise caused by a stick-slip phenomenon in a low-temperature atmosphere.

Further, the low-melting fatty acid amide having a melting point of 35 to 85° C. is optionally contained in the rubber composition. In other words, it is feasible to use the low-melting paraffin wax solely without using the low-melting fatty acid amide or feasible to use the low-melting paraffin wax and the low-melting fatty acid amide in combination. In the case where the low-melting paraffin wax is used solely without the low-melting fatty acid amide, the amount of the low-melting paraffin wax contained in the rubber composition is preferably 30 to 70 parts by mass per 100 parts by mass of all the rubber components. Further, the total amount of the low-melting paraffin wax and the low-melting fatty acid amide contained in the rubber composition is 30 to 100 parts by mass, preferably 40 to 80 parts by mass, per 100 parts by mass of all the rubber components.

There is no particular limitation on the kind of the low-melting paraffin wax used as long as the melting point of the low-melting paraffin wax is in the range of 45 to 57° C. In terms of handling ease, the low-melting paraffin wax used is preferably in particulate form or granular form.

Specific examples of the low-melting paraffin wax include: those available from Nippon Seiro Co., Ltd. under the tradenames of Paraffin Wax-115, Paraffin Wax-120, Paraffin Wax-125 and Paraffin Wax-130; and the like.

For the purpose of improving the static ozone resistance of a diene rubber, a paraffin wax may be added in an amount of 5 parts or less by mass per 100 parts by mass of all rubber components. However, an ozone resistance improvement effect is not obtained as expected when the paraffin wax is added in an amount of 3 parts by mass or more for improvement of ozone resistance (and even when the paraffin wax is added in an amount of 5 parts by mass or less in terms of durability). For the purpose of improving the ozone resistance of an automotive anti-vibration rubber, a paraffin wax having a melting point of 60° C. or higher may be commonly added in consideration of exposure to a high-temperature atmosphere.

Even in the present invention, a high-melting paraffin wax having a melting point higher than 57° C. can be contained in the rubber composition in an amount of e.g. 5 parts or less by mass per 100 parts by mass of all the rubber components for improvement of ozone resistance.

As mentioned above, the total amount of the low-melting paraffin wax and the low-melting fatty acid amide contained in the rubber composition is 30 to 100 parts by mass per 100 parts by mass of all the rubber components in the present invention. Although the low-melting paraffin wax can be used solely in an amount of preferably 30 to 70 parts by mass as mentioned above, it is preferable to use the low-melting paraffin wax and the low-melting fatty acid amide in combination because the combined use of the low-melting paraffin wax and the low-melting fatty acid amide facilitates earlier deposition of the wax components on the surface of the rubber molded body. The amount of the low-melting fatty acid amide contained is in the range of 10 to 40 parts by mass, more preferably 10 to 30 parts by mass, per 100 parts by mass of all the rubber components of the rubber composition.

The low-melting fatty acid amide is easy to deposit on the surface of the rubber molded body even in a low-temperature atmosphere and hence contributes to a reduction of friction in a low-temperature atmosphere. The amount of the low-melting fatty acid amide contained in the rubber composition is set as appropriate. Preferably, the amount of the low-melting fatty acid amide contained is in the range of 10 to 40 parts by mass per 100 parts by mass of all the rubber components of the rubber composition.

Specific examples of the low-melting fatty acid amide include N-oleyl oleamide (melting point: 35° C.), oleamide (melting point: 75° C.), erucamide (melting point: 81° C.), N-stearyl oleamide (melting point: 67° C.), N-stearyl erucamide (melting point: 74° C.), and the like. Preferably, the low-melting fatty acid amide has a melting point of 50 to 85° C. When the melting point of the low-melting fatty acid is lower than 50° C., there may be generated a solid of the fatty acid amide during transport. Among others, preferred are oleamide (melting point: 75° C.) and erucamide (melting point: 81° C.), each of which is easily deposited in a relatively low-temperature atmosphere.

In the present invention, the rubber composition may contain a high-melting fatty acid amide having a melting point higher than 85° C. (hereinafter also simply referred to as "high-melting fatty acid amide) for the purpose of ensuring sliding durability even when exposed to a high-temperature atmosphere for a long term.

Specific examples of the high-melting fatty acid amide include lauramide (melting point: 87° C.), palmitamide (melting point: 100° C.), stearamide (melting point: 101° C.), hydroxystearamide (melting point: 107° C.), N-stearyl stearamide (melting point: 95° C.), ethylenebisoleamide (melting point: 119° C.), ethylenebiserucamide (melting point: 120° C.), hexamethylenebisoleamide (melting point: 110° C.), N,N'-oleyl adipamide (melting point: 118° C.), N,N'-oleyl sebacamide (melting point: 113° C.), methylenebisoleamide (melting point: 142° C.), ethylenebislauramide (melting point: 157° C.), ethylenebisstearamide (melting point: 145° C.), ethylenebishydroxystearamide (melting point: 145° C.), ethylenebisbehenamide (melting point: 142° C.), hexamethylenebisstearamide (melting point: 140° C.), hexamethylenebisbehenamide (melting point: 142° C.), hexamethylenebishydroxystearamide (melting point: 135° C.), N,N'-distearyl adipamide (melting point: 141° C.), and the like.

The amount of the high-melting fatty acid amide contained in the rubber composition is in the range of e.g. 10 parts by mass or less per 100 parts by mass of all the rubber components. It is not preferable to use the high-melting fatty acid amide in an amount exceeding 10 parts by mass because the use of such a large amount of the high-melting fatty acid amide leads to an increase of material cost with almost no difference in slidability improvement effect.

[Wax Component Other than Paraffin Wax and Fatty Acid Amide]

In the present invention, the rubber composition may contain a microcrystalline wax, a polyethyelene wax etc. in an amount of 5 parts by mass or less in addition to the above-mentioned wax components.

A microcrystalline wax, which is known to have a relatively high melting point as compared to a paraffin wax, is sometimes used by being mixed with a paraffin wax for the purpose of improving the ozone resistance and processability of a diene rubber. Herein, the term "microcrystalline wax" refers to a wax containing an isoparaffin wax as a predominant component together with a small amount of normal paraffin wax and naphthene. The paraffin wax and the microcrystalline wax are classified by differences in production method and melting point.

[Vulcanizing Chemicals (Vulcanizing Agent, Vulcanization Accelerator and Vulcanization Retarder)]

In the present invention, the rubber composition may contain a vulcanizing chemical(s). Herein, the term "vulcanizing chemical" refer to a chemical in general that contributes to vulcanization, such as a vulcanizing agent, a vulcanization accelerator, a vulcanization retarder etc. Since some of chemicals classified as vulcanization accelerators also function as vulcanizing agents, it may be difficult to classify whether it is a vulcanization accelerator or a vulcanizing agent. For this reason, a vulcanization accelerator and a vulcanizing agent are hereinafter occasionally simply referred to as vulcanizing chemicals for the sake of convenience.

A known type of vulcanizing agent is usable in the present invention. There can be adopted any vulcanization process such as vulcanization with sulfur or a sulfur compound, resin vulcanization, quinoid vulcanization, bismaleimide vulcanization, organic peroxide vulcanization. Among others, vulcanization with sulfur or a sulfur compound is preferred for durability improvement of the anti-vibration rubber.

Examples of the sulfur or sulfur compound usable as the vulcanizing agent include sulfur, sulfur chloride, 2-(4'-morpholinodithio)benzothiazole, 4,4'-dithiodimorpholine, tetramethylthiuram disulfide, tetraethylthiuram disulfide, tetrabutylthiuram disulfide, tetrakis(2-ethylhexyl)thiuram disulfide, tetrabenzylthiuram disulfide, dipentamethylenethiuram tetrasulfide, and the like.

In the case where sulfur is used as the vulcanizing agent, the amount of sulfur used is preferably 0.1 to 0.8 parts by mass per 100 parts by mass of all the rubber components. It is known that, although sulfur vulcanization of a rubber leads to good durability, the sulfur-vulcanized rubber becomes poor in heat resistance with increase in the amount of sulfur used. It is thus preferable to use sulfur in an amount of 0.1 to 0.8 parts by mass in view of compatibility between durability and heat resistance.

As the vulcanizing chemical, it is preferable to use one or more selected from the group consisting of tetrakis(2-ethylhexyl)thiuram disulfide, 2-(4'-morpholinodithio)benzothiazole and 4,4'-dithiodimorpholine in an amount of 0.5 to 10 parts by mass, more preferably 1 to 10 parts by mass, per 100 parts by mass of all the rubber components. When one or more selected from the group consisting of tetrakis(2-ethylhexyl)thiuram disulfide, 2-(4'-morpholinodithio)benzothiazole and 4,4'-dithiodimorpholine is used in an amount of 0.5 to 10 parts by mass, it means that the total amount of tetrakis(2-ethylhexyl)thiuram disulfide, 2-(4'-morpholinodithio)benzothiazole and 4,4'-dithiodimorpholine used is 0.5 to 10 parts by mass. As mentioned above, the fatty acid amide is preferably contained in the rubber composition in an amount of 10 parts by mass or more per 100 parts by mass of all the rubber components. The rubber composition containing such a relatively large amount of fatty acid amide tends to be high in vulcanization speed and short in scorch time. With the addition of one or more of tetrakis(2-ethylhexyl)thiuram disulfide, 2-(4'-morpholinodithio)benzothiazole and 4,4'-dithiodimorpholine in a total amount of 0.5 to 10 parts by mass, there can easily be obtained the rubber composition high in heat resistance and high in scorch resistance (i.e. less susceptible to scorching).

In the case where the sulfur compound is used as the vulcanizing agent, it is preferable to use the vulcanization accelerator in combination with the sulfur compound.

Examples of the vulcanization accelerator include: sulfonamide compounds such as N-cyclohexyl-2-benzothiazolesulfenamide, N-oxydiethylene-2-benzothiazolesulfenamide and N,N-diisopropyl-2-benzothiazolesulfenamide; thiazole compounds such as 2-mercaptobenzothiazole, 2-(2,4-dinitrophenyl)mercaptobenzothiazole, 2-(2,6-diethyl-4-morpholinothio)benzothiazole and dibenzothiazyl disulfide; guanidine compounds such as diphenyl guanidine, triphenyl guanidine, diorthonitrile guanidine, orthonitrile biguanide and diphenylguanidine phthalate; thiuram compounds such as tetramethylthiuram monosulfide, tetramethylthiuram disulfide, tetraethylthiuram disulfide, tetrabutylthiuram disulfide, tetrakis(2-ethylhexyl)thiuram disulfide, tetrabenzylthiuram disulfide and dipentamethylenethiuram tetrasulfide; and the like.

Further, the vulcanization retarder (anti-scorching agent) such as N-cyclohexylthio phthalimide, N-phenyl-N-(trichloromethylthio)benzenesulfonamide, or the like may preferably be used for adjustment of vulcanization speed.

[Carbon Black]

In the present invention, the rubber composition may contain a carbon black. There is no particular limitation on the kind of the carbon black used in the present invention. For example, commercially available carbon blacks are usable. Preferably, a carbon black having a nitrogen adsorption specific surface area of 38 to 120 $m^2/g$ is contained in an amount of e.g. 40 to 90 parts by mass per 100 parts by mass of all the rubber components. Herein, the term "nitrogen adsorption specific surface area" is a measure of the particle size of the carbon black. A large nitrogen adsorption specific surface area means a small particle size. With the use of the carbon black having a nitrogen adsorption specific surface area of 38 to 120 $m^2/g$, there can easily be obtained the rubber molded body with good reinforcing performance (durability), low friction characteristics and low compression set properties (less deformation).

Examples of the carbon black having a nitrogen adsorption specific surface area of 38 to 120 $m^2/g$ include those known as furnace blacks for rubbers, such as ISAF grade carbon black, ISAF-HS grade carbon black, ISAF-LS grade carbon black, HAF grade carbon black, HAF-HS grade carbon black, HAF-LS grade carbon black, MAF grade carbon black, MAF-HS grade carbon black and FEF grade carbon black. Furthermore, a carbon black for coloring or a conductive carbon black can also be used without any problem as long as the carbon black has a nitrogen adsorption specific surface area of 38 to 120 $m^2/g$. Examples of such a carbon black include: those available form Tokai Carbon Co., Ltd. under the trade names of TOKABLACK #7360SB, TOKABLACK #7270SB and TOKABLACK #4500; those available from Mitsubishi Chemical Corporation under the trade names of MA8, MA230 and MA220; those available from Asahi Carbon Co., Ltd. under the trade names of SB735, SBSB285, SB335, SB605 and SB625; and the like.

For adjustment of hardness and processability, the rubber composition may contain a carbon black having a nitrogen adsorption specific surface area of smaller than 38 $m^2/g$ in combination with the above-mentioned carbon black. In this case, the carbon black having a nitrogen adsorption specific surface area of smaller than 38 $m^2/g$ is preferably contained in an amount of e.g. 20 parts by mass or less per 100 parts by mass of all the rubber components.

[Vulcanization Aid]

In the case where the sulfur compound is used as the vulcanizing agent, it is preferable to use a vulcanization aid in combination with the vulcanizing agent. Examples of the vulcanization aid include zinc oxide (ZnO), composite zinc white, stearic acid, zinc stearate, and the like. These vulcanization aids can be used solely or in combination of two or more kinds thereof. Herein, the composite zinc white is known as a material having a layer of zinc oxide (hydrozincite) at a surface thereof and containing an inorganic metal salt as a core component as exemplified by those available from INOUE Calcium Corporation as META-Z Series (such as META-Z L40, L50 and L60). The amount of the zinc oxide or composite zinc white used is preferably 3 to 15 parts by mass per 100 parts by mass of all the rubber components. The amount of the stearic acid or zinc stearate used is preferably 0.1 to 3 parts by mass per 100 parts by mass of all the rubber components.

[Anti-Aging Agent]

In the present invention, the rubber composition may preferably contain an anti-aging agent. Since the diene rubbers (natural rubber and butadiene rubber) used in the present invention are not high in ozone resistance and heat resistance, it is preferable to improve the ozone- and heat-resistance of the diene rubbers as appropriate with the addition of a known anti-aging agent. Examples of the anti-aging agent include carbamate anti-aging agents, phenylene diamine anti-aging agents, phenol anti-aging agents, diphenylamine anti-aging agents, quinoline anti-aging agents, imidazole anti-aging agents, waxes, and the like. These anti-aging agents can be used solely or in combination of two or more kinds thereof. The amount of the anti-aging agent used is preferably 1 to 15 parts by mass, more preferably 3 to 10 parts by mass, per 100 parts by mass of all the rubber components.

[Filler]

In the present invention, the rubber composition may contain a filler for adjustment of hardness and improvement of processability. A filler commonly used for rubber compositions is usable. Examples of the filler include silica such as wet silica, dry silica or colloidal silica, calcium carbonate, clay, talc, and the like. These fillers can be used solely or in combination of two or more kinds thereof.

[Process Oil]

In the present invention, the rubber composition may also contain a process oil for adjustment of hardness and improvement of processability. Examples of the process oil include naphthenic oils, paraffin oils, aromatic oils, and the like. These process oils can be used solely or in combination of two or more kinds thereof.

[Processing Aid]

The rubber composition may contain a processing aid for improvement of processability in the present invention. As the processing aid, a compound commonly used for rubber processing is usable. Examples of the processing aid include: higher fatty acids such as ricinoleic acid, stearic acid, palmitic acid and lauric acid; salts of higher fatty acids, such as barium stearate, zinc stearate and calcium stearate; esters of higher fatty acids, such as ricinoleic ester, stearic ester, palmitic ester and lauric ester; and the like. These processing aids can be used solely or in combination of two or more kinds thereof.

[Coupling Agent]

For adjustment of vibration characteristics, the rubber composition may further contain a coupling agent for carbon black or a silane coupling agent in the present invention. Examples of the coupling agent for carbon black include hydrazide-based coupling agents, sulfide-based coupling agents, pyrazolone-based coupling agents, and the like. Examples of the silane coupling agent include mercapto-based silane coupling agents, sulfide-based silane coupling agents; amine-based silane coupling agents, epoxy-based silane coupling agents, vinyl-based silane coupling agents, and the like. As the silane coupling agent, mercapto-based silane coupling agents and sulfide-based silane coupling agents are preferred. The above coupling agents can be used solely or in combination of two or more kinds thereof.

EXAMPLES

The present invention will be described in more detail below by way of the following embodiment examples. It should however be understood that these embodiment examples are illustrative and are not intended to limit the present invention thereto.

[Preparation of Rubber Compositions]

Rubber Compositions of Examples 1 to 10 and Comparative Examples 1 to 8 were prepared by mixing various component materials at content ratios shown in TABLES 1 and 2. More specifically, component materials except a vulcanizing agent and a vulcanization accelerator were first mixed by a Banbury mixer for 5 minutes. The resulting mixture was mixed with a vulcanizing agent and a vulcanization accelerator by an open roll kneader for 5 minutes while being cooled by setting the temperature of the cooling medium inside the open roll kneader to about 20° C.

[Production of Rubber Molded Bodies]

The above-prepared rubber compositions were each molded and vulcanized into a shape of the stabilizer bushing 1 shown in FIGS. 1 and 2. Herein, the molding and vulcanization were performed with the use of an injection molding machine under the conditions of a mold clamping force of 50 tons (about 490 kN), a temperature of 160° C. and a vulcanization time of 8 minutes. As shown in FIGS. 1 and 2, the stabilizer bushings 1 had a hollow portion 2 with a diameter of 18 mm and a main body portion 3 with an outer dimension of 43 mm.

Further, rubber sheets of 2 mm thickness were respectively formed by molding and vulcanizing the above-prepared rubber compositions. Herein, the molding and vulcanization were performed by compression molding with the use of a 2-mm sheet mold under the conditions of a temperature of 160° C. and a vulcanization time of (ct90+5) mins.

The thus-obtained rubber molded bodies (stabilizer bushings and vulcanized rubber sheets) were used as test samples for the after-mentioned evaluation tests.

TABLE 1

| | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Natural Rubber | 20 | 20 | 20 | 70 | 20 | 20 | 20 | 20 | 20 | 30 |
| Butadiene Rubber-1 | 80 | 80 | 80 | 30 | 80 | 80 | | 80 | 80 | 70 |
| Butadiene Rubber-2 | | | | | | | 80 | | | |
| Paraffin Wax-1 | | 25 | | | | | | | | |

TABLE 1-continued

| | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Paraffin Wax-2 | 25 | | 25 | 25 | 50 | 20 | 25 | 25 | | 60 |
| Paraffin Wax-3 | | | | | | | | | 25 | |
| Paraffin Wax-4 | 2 | 2 | 2 | 2 | 2 | 2 | 2 | 2 | 2 | 2 |
| Microcrystalline Wax | | | | | | | | | | |
| Fatty Acid Amide-1 | 25 | 25 | | 25 | 0 | 20 | 25 | 25 | 25 | 30 |
| Fatty Acid Amide-2 | | | 25 | | | | | | | |
| Fatty Acid Amide-3 | | | | | | | | | | |
| Zinc Oxide | 5 | 5 | 5 | 5 | 5 | 5 | 5 | 5 | 5 | 5 |
| Stearic Acid | 1 | 1 | 1 | 1 | 1 | 1 | 1 | 1 | 1 | 1 |
| Process Oil | | | | | | | | | | |
| Anti-Aging Agent-1 | 2 | 2 | 2 | 2 | 2 | 2 | 2 | 2 | 2 | 2 |
| Anti-Aging Agent-2 | 1 | 1 | 1 | 1 | 1 | 1 | 1 | 1 | 1 | 1 |
| Carbon Black-1 | 65 | 65 | 65 | | 65 | 60 | 65 | 65 | 65 | 90 |
| Carbon Black-2 | | | | 63 | | | | | | |
| Vulcanizing Chemical-1 | 1.0 | 1.0 | 1.0 | 1.0 | 1.0 | 1.0 | 1.0 | 1.0 | 1.0 | 1.0 |
| Vulcanizing Chemical-2 | 1.0 | 1.0 | 1.0 | | 1.0 | 1.0 | 1.0 | | 1.0 | 1.0 |
| Vulcanizing Chemical-3 | | | | | | | | 1.0 | | |
| Vulcanizing Chemical-4 | | | | 5.0 | | | | | | |
| Vulcanizing Chemical-5 | | | | 1.0 | | | | | | |
| Vulcanizing Chemical-6 | 1.2 | 1.2 | 1.2 | 1.2 | 1.2 | 1.2 | 1.2 | 1.2 | 1.2 | 1.2 |
| Vulcanizing Chemical-7 | | | | | 0.2 | | | | | |

(Units: Parts by Mass)

TABLE 2

| | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|
| Natural Rubber | 20 | 20 | 80 | 20 | 20 | 20 | | 100 |
| Butadiene Rubber-1 | 80 | 80 | 20 | 80 | 80 | 80 | 100 | |
| Fatty Acid Amide-1 | | | | | | | | |
| Fatty Acid Amide-2 | 25 | 50 | | 25 | 25 | | 25 | 25 |
| Fatty Acid Amide-3 | | | | | | 25 | | |
| Paraffin Wax-1 | | | | | | | | |
| Paraffin Wax-2 | | | 25 | | | 25 | 25 | 25 |
| Paraffin Wax-3 | | | | | | | | |
| Paraffin Wax-4 | 2 | 2 | 2 | 27 | 2 | 2 | 2 | 2 |
| Microcrystalline Wax | | | | | 25 | | | |
| Zinc Oxide | 5 | 5 | 5 | 5 | 5 | 5 | 5 | 5 |
| Stearic Acid | 1 | 1 | 1 | 1 | 1 | 1 | 1 | 1 |
| Process Oil | 12 | | 12 | | | | | |
| Anti-Aging Agent-1 | 2 | 2 | 2 | 2 | 2 | 2 | 2 | 2 |
| Anti-Aging Agent-2 | 1 | 1 | 1 | 1 | 1 | 1 | 1 | 1 |
| Anti-Aging Agent-3 | 2 | 2 | 2 | 2 | 2 | 2 | 2 | 2 |
| Carbon Black-1 | 65 | 65 | 65 | 65 | 65 | 65 | 65 | 65 |
| Vulcanizing Chemical-1 | 1.0 | 1.0 | 1.0 | 1.0 | 1.0 | 1.0 | 1.0 | 1.0 |
| Vulcanizing Chemical-2 | | 1.0 | | 1.0 | 1.0 | 1.0 | 1.0 | 1.0 |
| Vulcanizing Chemical-3 | | | | | | | | |
| Vulcanizing Chemical-4 | | | | | | | | |
| Vulcanizing Chemical-5 | 0.7 | | 0.7 | | | | | |
| Vulcanizing Chemical-6 | 1.2 | 1.2 | 1.2 | 1.2 | 1.2 | 1.2 | 1.2 | 1.2 |
| Vulcanizing Chemical-7 | | | | | 0.2 | | 0.3 | |

(Units: Parts by Mass)

The component materials shown in TABLES 1 and 2 were as follows.

Natural Rubber: Standard Vietnamese Rubber CV60 (SVR-CV60)

Butadiene Rubber-1: "BUNA-CB21" (cis-1,4 bond content: 96%, Mooney viscosity $ML_{1+4}$: 63) available from ARLANXEO Corporation Butadiene Rubber-2: "JSR BR-01" (cis-1,4 bond content: 96%, Mooney viscosity $ML_{1+4}$: 44) available from JSR Corporation Paraffin Wax-1: "Paraffin Wax-115" (melting point: 48° C.) available from Nippon Seiro Co., Ltd.

Paraffin Wax-2: "Paraffin Wax-125" (melting point: 53° C.) available from Nippon Seiro Co., Ltd.

Paraffin Wax-3: "Paraffin Wax-130" (melting point: 56° C.) available from Nippon Seiro Co., Ltd.

Paraffin Wax-4: "Ozoace-0100" (melting point: 65° C.) available from Nippon Seiro Co., Ltd.

Microcrystalline Wax: "Hi-Mic-1070" (melting point: 75° C.) available from Nippon Seiro Co., Ltd.

Fatty Acid Amide-1: "Diamide O-200" (oleyl oleamide, melting point: 75° C.) available from Mitsubishi Chemical Corporation Fatty Acid Amide-2: "Diamide L-200" (erucamide, melting point: 81° C.) available from Mitsubishi Chemical Corporation Fatty Acid Amide-3: "Diamide 200" (stearyl oleamide, melting point: 101° C.) available from Mitsubishi Chemical Corporation Zinc Oxide: "Zinc oxide grade 2" available from Sakai Chemical Industry Co., Ltd.

Stearic Acid: "Stearic Acid TUBAKI" available from NOF Corporation

Anti-Aging Agent-1: "Vulkanox 4020" (N-phenyl-N'-(1,3-dimethylbutyl)-p-phenylenediamine) available from LANXESS Corporation Anti-Aging Agent-2: "NOCRAC MB" (2-mercaptobenzimidazole) available from Ouchi Shinko Industrial Co., Ltd.

Carbon Black-1: "VULCAN 3D" (nitrogen adsorption specific surface area: 75 $m^2$/g, HAF Grade) available from Cabot Japan K.K.

Carbon Black-2: "Niteron #10" (nitrogen adsorption specific surface area: 47 $m^2$/g, MAF Grade) available from Nippon Steel Carbon Co., Ltd.

Process Oil: "Crisef Oil H56" available from ENEOS Corporation

Vulcanizing Chemical-1: "GOLDEN FLOWER Sulfur Powder 200 Mesh" (sulfur) available from Tsurumi Chemical Industrial Co., Ltd.

Vulcanizing Chemical-2: "Nocceler MDB-P" (2-(4'-morpholinodithio)benzothiazole) available from Ouchi Shinko Industrial Co., Ltd.

Vulcanizing Chemical-3: "ACTOR R" (4,4'-dithiodimorpholine) available from Kawaguchi Chemical Industry Co., Ltd.

Vulcanizing Chemical-4: "Nocceler TOT-N" (tetrakis(2-ethylhexyl)thiuram disulfide) available from Ouchi Shinko Industrial Co., Ltd.

Vulcanizing Chemical-5: "Nocceler TT-P" (tetramethylthiuram disulfide) available from Ouchi Shinko Industrial Co., Ltd.

Vulcanizing Chemical-6: "Nocceler CZ-G" (N-cyclohexyl-2-benzothiazolesulfenamide) available from Ouchi Shinko Industrial Co., Ltd.

Vulcanizing Chemical-7: "Nocceler D" (1,3-diphenylguanidine) available from Ouchi Shinko Industrial Co., Ltd.

[Evaluation Tests]

The evaluation tests were conducted as follows on the rubber compositions of Examples 1 to 10 and Comparative Examples 1 to 8 and the rubber molded bodies (stabilizer bushings and rubber sheets) produced therefrom. The results of the evaluation tests are shown in TABLES 3 and 4.

[Processability]

The mixability (ease of compounding) during preparation of the rubber compositions of Examples 1 to 10 and Comparative Examples 1 to 8 (was evaluated by observation. By comparing the mixability of the respective rubber compositions, the processability of the rubber composition was judged as: "○ (good)" when the mixability was high; and "X (not good)" when the mixability was low.

[Vulcanization Characteristics (Vulcanization Speed of Unvulcanized Rubber Composition)]

With the use of a curemeter "Curelastometer V-type", the vulcanization curves of the rubber compositions of Examples 1 to 10 and Comparative Examples 1 to 8 were each measured for 20 minutes according to JIS K 6300-2 under the conditions of a measurement temperature of 150° C., an amplitude angle of #1° and a frequency of 100 cpm. The tC(10) and tC(90) values (both in units of min) of the rubber compositions were determined from the measured vulcanization curves, respectively. Herein, the tC(10) value corresponds to an induction time of vulcanization; and the tC(90) value corresponds to a 90% vulcanization time.

[Mooney Scorch Time]

The Mooney viscosity of the rubber compositions of Examples 1 to 10 and Comparative Examples 1 to 8 was measured according to JIS K 6300-1 with the use of a Mooney viscometer with an L-shaped rotor. The minimum value of the Mooney viscosity at a measurement temperature of 125° C. was determined as Vm. The time t5 during which the Mooney viscosity rose by 5M (Mooney unit) from the minimum value Vm was determined as the Mooney scorch time. When the Mooney scorch time was shorter than 12 minutes, the rubber composition was evaluated as "X (not being suitable for production of the rubber molded body)" upon judging that there was a fear of premature vulcanization of the rubber composition which could result in a deterioration in productivity of the rubber molded body (as the bushing for noise reduction). The rubber composition was evaluated as "○ (suitable for production of the rubber molded body)" when the Mooney scorch time was 12 minutes or longer.

[Vulcanized Rubber Hardness]

The vulcanized rubber sheets produced from the rubber compositions of Examples 1 to 10 and Comparative Examples 1 to 8 were cut into test samples of predetermined shape. The hardness (Ha) of the respective rubber samples was measured according to JIS K 6253-3 with the use of a durometer Type-A.

[Tensile Properties]

The vulcanized rubber sheets produced from the rubber compositions of Examples 1 to 10 and Comparative Examples 1 to 8 were punched into JIS No. 3 dumbbell-shaped test samples. The tensile strength (Tb) at break and the elongation (Eb) at break of the respective rubber samples were measured according to JIS K 6251. The vulcanized rubber sheet was evaluated as "(satisfactory)" when the tensile strength (Tb) at break was 14 MPa or higher. When the tensile strength (Tb) at break was lower than 14 MPa, the vulcanized rubber sheet was evaluated as "X (not satisfactory)" upon judging that the rubber sheet was low in strength and susceptible to breakage under the application of a strong force.

[Friction Coefficient]

The vulcanized rubber sheets produced from the rubber compositions of Examples 1 to 10 and Comparative Examples 1 to 8 were cut into test samples S of 50 mm×10 mm in size. In other words, each of the test samples S had a length of 50 mm, a width of 10 mm and a thickness of 2 mm. After the test samples S were left for 24 hours in an atmosphere of 23° C., the friction coefficient of the respective test samples S was measured with the use of a HEIDON's friction tester 6 as shown in FIG. 4.

The friction tester 6 used herein had: a fixed stage 60; a movable stage 61 disposed movably on the fixed stage 60 and configured to support thereon the test sample S in sliding contact with a counterpart member 63; a load cell 62 connected to the counterpart member 63 so as to measure a load exerted on the counterpart member 63; an operation lever 64 pivotable about a fulcrum between the load cell 62 and the counterpart member 63 so as to adjust the position of the counterpart member 63; and a balancer 65 disposed between the fulcrum and the load cell 62. The counterpart member 63 was formed of stainless steel and had a contact surface formed with a size of 10 mm×10 mm and a surface roughness (Rmax) of 5 to 10 μm. Further, a weight W of 100 g was placed on the counterpart member 63.

Figure 4:
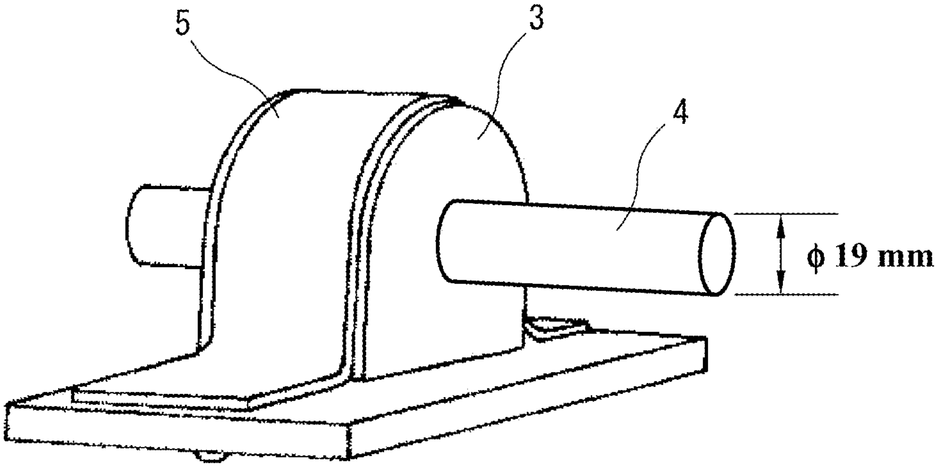
FIG. 4 is a perspective view for explaining an abnormal noise evaluation method.

The test sample S was adhered onto the movable stage 61 such that the length direction of the test sample S was aligned along the planar direction (i.e. the direction of a black solid arrow in FIG. 4). The movable stage 61 was moved by 16.7 mm in the planar direction at a speed of 16.7 mm/sec, thereby allowing the test specimen S to slide against the counterpart member 63 fixed immovably to the load cell 62. At this time, the frictional force (F) acting on the counterpart member 63 was measured with the load cell 2. The friction coefficient of the test sample S was obtained according to the equation F=μN where μ was the friction coefficient; N was the normal force. The peak friction coefficient first obtained upon starting movement of the movable stage 61 was determined as the static friction coefficient (μs). The average friction coefficient obtained during 16.7 mm movement of the movable stage 61 was determined as the dynamic friction coefficient (μd).

[Abnormal Noise Evaluation]

(Abnormal Noise Evaluation in Initial State)

The rubber molded bodies produced as the stabilizer bushings 1 from the rubber compositions of Examples 1 to 10 and Comparative Examples 1 to 8 were each checked for the occurrence of abnormal noise by simulating the initial product state according to the following procedure.

Figure 5:
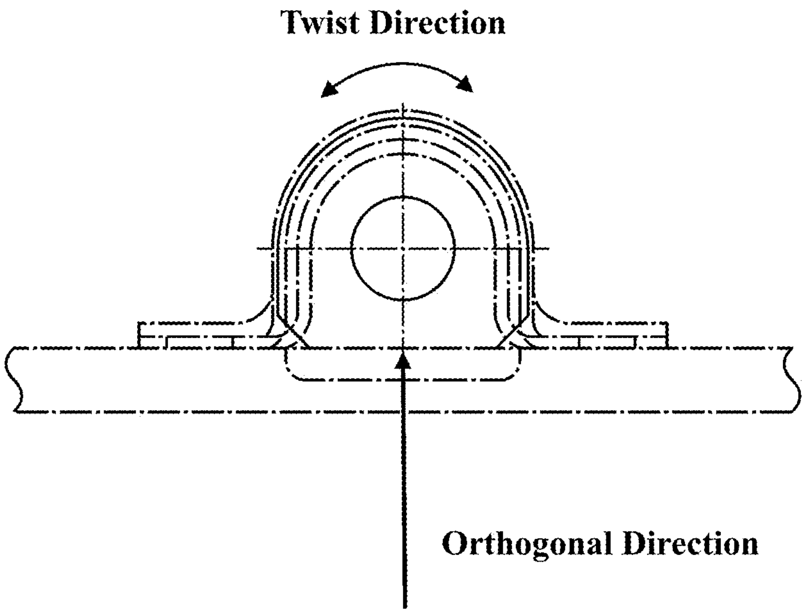
FIG. 5 is a front view for explaining the abnormal noise evaluation method.

As shown in FIGS. 4 and 5, provided was a stabilizer bar 4 formed of iron with a diameter of 19 mm and having a surface coated by electrodeposition coating (cationic coating). The stabilizer bar 4 was inserted through the hollow portion 2 of the stabilizer bushing 1, and then, the stabilizer bushing 1 was fixed to a fixed stand 50 in a state of being compressed by a substantially U-shaped bracket 5 in the radial direction of the hollow portion 2. In this state, the stabilizer bar 4 was rotated about its axis relative to the stabilizer bushing 1 by an angle of ±15° in the twist direction at a frequency of 1 Hz. While the rotation was performed in a low-temperature atmosphere (0° C., −10° C., −20° C., −30° C. or −40° C.) for 5 minutes, the occurrence of abnormal noise was checked. The abnormal noise evaluation in the initial product state was judged as: "○" when there did not occur abnormal noise during the lapse of 5 minutes from the start of the rotation; and "X" when there occurred abnormal noise during the lapse of 5 minutes from the start of the rotation.

(Abnormal Noise Evaluation After Endurance Process)

The stabilizer bushings 1 of which the abnormal noise evaluation in the initial product state was judged as "○" in the above evaluation test were further checked for the occurrence of abnormal noise by simulating the product state after endurance process according to the following procedure.

Immediately after the abnormal noise evaluation in the initial product state, the stabilizer bar 4 was rotated about its axis relative to the stabilizer bushing 1 for 168 hours under the same conditions as above (i.e. an angle of ±15° in the twist direction, a frequency of 1 Hz and a low-temperature atmosphere). After that, water was filled into a clearance between the hollow portion 2 of the stabilizer bushing 1 and the stabilizer bar 4. While the stabilizer bar 4 was further rotated about its axis for 5 minutes, the occurrence of abnormal noise was checked. The judgment of the abnormal noise evaluation was made in the same manner as above.

[Overall Evaluation]

The overall evaluation was judged as: "○ (good)" when all of the above evaluation items were "○"; and "X (not good)" when at least one of the above evaluation items was "X".

TABLE 3

| | Remarks | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|---|
| Processability | Mixability | ○ | ○ | ○ | ○ | ○ | ○ | ○ | ○ | ○ | ○ |
| Vulcanization Characteristics | tC(10) (min) | 3.4 | 3.5 | 3.5 | 3.8 | 5.3 | 2.9 | 3.5 | 3.7 | 3.2 | 3.1 |
| | tC(90) (min) | 10.1 | 10.2 | 10.4 | 8.8 | 15.2 | 9.9 | 10.4 | 13.1 | 10.2 | 10.1 |
| Mooney Scorch Time | t5 (min) | 15.8 | 16.2 | 16.3 | 17.7 | 20.2 | 14.3 | 15.5 | 16.5 | 15.5 | 14.6 |
| | Evaluation | ○ | ○ | ○ | ○ | ○ | ○ | ○ | ○ | ○ | ○ |
| Hardness | Ha | 66 | 65 | 66 | 67 | 65 | 65 | 65 | 68 | 68 | 68 |
| Tensile Properties | Eb (%) | 540 | 550 | 540 | 560 | 540 | 540 | 500 | 560 | 550 | 500 |
| | Tb (MPa) | 19.9 | 20.1 | 19.6 | 23.1 | 19.1 | 19.1 | 17.1 | 19.6 | 20.5 | 15.1 |
| | Evaluation | ○ | ○ | ○ | ○ | ○ | ○ | ○ | ○ | ○ | ○ |
| Friction | Static Friction Coefficient | 0.4 | 0.4 | 0.4 | 0.7 | 0.7 | 0.6 | 0.5 | 0.5 | 0.6 | 0.5 |
| | Dynamic Friction Coefficient | 0.3 | 0.3 | 0.3 | 0.5 | 0.5 | 0.5 | 0.3 | 0.4 | 0.5 | 0.3 |
| Abnormal Noise Evaluation in Low-Temperature Atmosphere in Initial State | 0° C. | ○ | ○ | ○ | ○ | ○ | ○ | ○ | ○ | ○ | ○ |
| | −10° C. | ○ | ○ | ○ | ○ | ○ | ○ | ○ | ○ | ○ | ○ |
| | −20° C. | ○ | ○ | ○ | ○ | ○ | ○ | ○ | ○ | ○ | ○ |
| | −30° C. | ○ | ○ | ○ | ○ | ○ | ○ | ○ | ○ | ○ | ○ |
| | −40° C. | ○ | ○ | ○ | ○ | ○ | ○ | ○ | ○ | ○ | ○ |
| Abnormal Noise Evaluation in Low-Temperature Atmosphere After Endurance Process | 0° C. | ○ | ○ | ○ | ○ | ○ | ○ | ○ | ○ | ○ | ○ |
| | −10° C. | ○ | ○ | ○ | ○ | ○ | ○ | ○ | ○ | ○ | ○ |
| | −20° C. | ○ | ○ | ○ | ○ | ○ | ○ | ○ | ○ | ○ | ○ |
| | −30° C. | ○ | ○ | ○ | ○ | ○ | ○ | ○ | ○ | ○ | ○ |
| | −40° C. | ○ | ○ | ○ | ○ | ○ | ○ | ○ | ○ | ○ | ○ |
| Overall Evaluation | | ○ | ○ | ○ | ○ | ○ | ○ | ○ | ○ | ○ | ○ |

TABLE 4

| | Remarks | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|
| Processability | Mixability | ○ | ○ | ○ | ○ | ○ | ○ | X | ○ |
| Vulcanization Characteristics | tC(10) (min) | 1.7 | 2.6 | 4.9 | 3.5 | 3.4 | 3.5 | 3.8 | 2.7 |
| | tC(90) (min) | 4.3 | 9.7 | 14.6 | 10.2 | 10.3 | 10.9 | 11.5 | 8.9 |
| Mooney Scorch Time | t5 (min) | 8.2 | 11.7 | 19.5 | 15.7 | 14.9 | 15.5 | 16.4 | 11.9 |
| | Evaluation | X | X | ○ | ○ | ○ | ○ | ○ | X |
| Hardness | Ha | 72 | 66 | 73 | 66 | 66 | 66 | 67 | 65 |
| Tensile Properties | Eb (%) | 470 | 530 | 480 | 540 | 550 | 550 | 370 | 580 |
| | Tb (MPa) | 20.1 | 18.1 | 20.4 | 19.5 | 19.7 | 19.9 | 11.6 | 24.1 |
| | Evaluation | ○ | ○ | ○ | ○ | ○ | ○ | X | ○ |
| Friction | Static Friction Coefficient | 0.5 | 0.3 | 0.8 | 0.6 | 0.8 | 0.8 | 0.4 | 0.6 |
| | Dynamic Friction Coefficient | 0.4 | 0.2 | 0.6 | 0.4 | 0.7 | 0.6 | 0.3 | 0.4 |

TABLE 4-continued

| | Remarks | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|
| Abnormal Noise Evaluation | 0° C. | X | ○ | X | X | X | X | Not | ○ |
| in Low-Temperature | −10° C. | X | ○ | X | X | X | X | Done | ○ |
| Atmosphere | −20° C. | X | ○ | X | X | X | X | | ○ |
| in Initial State | −30° C. | X | ○ | X | X | X | X | | ○ |
| | −40° C. | X | ○ | X | X | X | X | | ○ |
| Abnormal Noise Evaluation | 0° C. | Not | X | Not | Not | Not | Not | Not | X |
| in Low-Temperature | −10° C. | Done | X | Done | Done | Done | Done | Done | X |
| Atmosphere | −20° C. | | X | | | | | | X |
| After Endurance Process | −30° C. | | X | | | | | | X |
| | −40° C. | | X | | | | | | X |
| Overall Evaluation | | X | X | X | X | X | X | X | X |

In Examples 1 to 10, the mass ratio NR/BR of the rubber composition was in the range of 80/20 to 10/90; the amount of the low-melting paraffin contained in the rubber composition was in the range of 20 to 70 parts by mass per 100 parts by mass of all the rubber components; and the total amount of the low-melting paraffin wax and the low-melting fatty acid amide contained in the rubber composition was in the range of 30 to 100 parts by mass per 100 parts by mass of all the rubber components. In other words, the rubber compositions of Examples 1 to 10 were within the scope of the present invention. In each of Examples 1 to 10, all of the evaluation items were "○"; and thus, the overall evaluation was "○".

By contrast, the resin compositions of Comparative Examples 1 to 8 were out of the scope of the present invention in terms of any of the mass ratio NR/BR, the content amount of the low-melting paraffin and the total content amount of the low-melting paraffin wax and the low-melting fatty acid amide. In each of Comparative Examples 1 to 8, any of the evaluation items was "X"; and thus, the overall evaluation was "X".

More specifically, in Comparative Examples 1 and 2 where the rubber composition contained only the low-melting fatty acid amide (Fatty Acid Amide-2) with no low-melting paraffin wax, the friction coefficient of the rubber molded body at room temperature was low. In these Comparative Examples, however, there occurred abnormal noise during the abnormal noise evaluation test in the low-temperature atmosphere in the initial product state or after the endurance process. In the case where there occurred abnormal noise during the abnormal noise evaluation test in the initial product state, the abnormal noise evaluation test after the endurance process was not conducted upon judging that the rubber molded body was unsatisfactory as the product (the same applies to the following).

In Comparative Example 3 where the total amount of the low-melting paraffin wax and the low-melting fatty acid amide was less than 30 parts by mass, there occurred abnormal noise during the abnormal noise evaluation test in the low-temperature atmosphere in the initial product state. There also occurred abnormal noise during the abnormal noise evaluation test in the low-temperature atmosphere in the initial product state in Comparative Examples 4 and 5 where the rubber composition did not contain the low-melting paraffin wax and contained the high-melting paraffin wax (Paraffin Wax-4) together with or without the microcrystalline wax and in Comparative Example 6 where the rubber composition contained the low-melting paraffin amide (Paraffin Wax-2) in combination with the high-melting fatty acid amide (Fatty Acid Amide-3) rather than the low-melting fatty acid amide such that the total amount of the low-melting paraffin wax and the low-melting fatty acid amide was less than 30 parts by mass. In Comparative Example 7 where the rubber composition contained only the butadiene rubber (Butadiene Rubber-1) with no natural rubber, it was judged that the rubber molded body was unsatisfactory as the product because of the poor processability (mixability) of the rubber composition and the low tensile strength of the rubber molded body. For this reason, the abnormal noise evaluation test was not conducted in Comparative Example 7. In Comparative Example 8 where the rubber composition contained no butadiene rubber, there occurred abnormal noise during the abnormal noise evaluation test in the low-temperature atmosphere in the initial product state.

In Example 5 where the rubber composition contained the low-melting paraffin wax (Paraffin Wax-2) with no low-melting fatty acid amide and in Example 4 where the mass ratio NR/BR was 70/30, good evaluation results were obtained for all of the evaluation items. In these Examples, there was no problem even though the friction coefficient of the rubber molded body at room temperature tended to be slightly high. In Example 7 where the butadiene rubber contained in the rubber composition had a Mooney viscosity ($ML_{1+4}$) of 44, good evaluation results were obtained for all of the evaluation items. There was also no problem in this Example even though the strength of the rubber molded body tended to be slightly low as compared to that of Example 1.

It is apparent from the above evaluation results that that the rubber molded body according to the present invention attains an excellent abnormal noise suppression effect even during use in a low-temperature atmosphere (in particular, in a low-temperature atmosphere after long-term use) by forming the rubber molded body from the rubber composition in which: both of the natural rubber and the butadiene rubber are contained as the predominant rubber components at a mass ratio of 80/20 to 10/90; the amount of the low-melting paraffin wax contained is in the range of 20 to 70 parts by mass per 100 parts by mass of all the rubber components; and the total amount of the low-melting paraffin wax and the low-melting fatty acid amide contained is in the range of 40 to 100 parts by mass per 100 parts by mass of all the rubber components.

Although it is likely that abnormal noise will be caused by sliding contact (friction) between the rubber molded body and the counterpart member in a low-temperature atmosphere, the rubber molded body according to the present invention attains and maintains an excellent abnormal noise suppression effect even in such a low-temperature atmosphere (after long-term use or repeated friction) as compared to the rubber molded bodies formed from the conventional rubber compositions disclosed in e.g. JP H6-100731A, JP 2002-265691A and JP 2006-206788A.

INDUSTRIAL APPLICABILITY

The rubber molded body according to the present invention shows excellent sliding characteristics during sliding contact with the counterpart member, whereby it is less likely that abnormal noise will be caused by sliding contact (friction) between the rubber molded body and the counterpart member even in a low-temperature atmosphere (in particular, in a low-temperature atmosphere after long-term use).

In the case of a rubber molded product such as stabilizer bushing etc. which is often exposed to outside air, the rubber molded product would be used under a low-temperature atmosphere of e.g. −40 to 5° C. in winter or in cold climates. The rubber molded body according to the present invention is suitably applicable to such a rubber molded product such as stabilizer bushing etc. which could be subjected to sliding contact (friction) for a long term and could be exposed to a low-temperature atmosphere during long-term use.

Although the present invention has been described above with reference to the specific embodiments and examples, the above-described embodiments and examples are intended to facilitate understanding of the present invention and are not intended to limit the present invention thereto. Various changes and modifications of the above embodiments and examples can be made as appropriate without departing from the scope of the present invention.

The entire contents of Japanese Patent Application No. 2023-005750 (filed on Jan. 18, 2023) are herein incorporated by reference. The scope of the present invention is defined with reference to the following claims.

The invention claimed is:

1. A rubber molded body formed from a rubber composition, the rubber composition comprising: a natural rubber and a butadiene rubber as predominant rubber components; a low-melting paraffin wax having a melting point of 45 to 57° C.; and optionally a low-melting fatty acid amide having a melting point of 35 to 85° C., a mass ratio of the natural rubber to the butadiene rubber ranging from 80/20 to 10/90, an amount of the low-melting paraffin wax contained in the rubber composition ranging from 20 to 70 parts by mass per 100 parts by mass of all rubber components, and a total amount of the low-melting paraffin wax and the low-melting fatty acid amide contained in the rubber composition ranging from 30 to 100 parts by mass per 100 parts by mass of all rubber components.

2. The rubber molded body according to claim 1, wherein the mass ratio of the natural rubber to the butadiene rubber ranges from 40/60 to 15/85, wherein an amount of the butadiene rubber contained in the rubber composition ranges from 50 to 85 parts by mass per 100 parts by mass of all rubber components, and wherein the butadiene rubber has a cis-1,4 bond content of 90% or higher.

3. The rubber molded body according to claim 1, wherein an amount of the low-melting fatty acid amide contained in the rubber composition ranges from 10 to 40 parts by mass per 100 parts by mass of all rubber components.

4. The rubber molded body according to claim 2, wherein the butadiene rubber has a Mooney viscosity of 50 to 75 at 100° C., and wherein an amount of the butadiene rubber contained in the rubber composition ranges from 50 to 90 mass % with respect to the total mass of the rubber composition.

5. The rubber molded body according to claim 1, wherein the rubber composition further comprises, as a vulcanization accelerator, at least one selected from the group consisting of tetrakis(2-ethylhexyl) thiuram disulfide, 2-(4'-morpholinodithio)benzothiazole and 4,4'-dithiodimorpholine in an amount of 0.5 to 10 parts by mass per 100 parts by mass of all rubber components.

6. The rubber molded body according to claim 1, wherein the rubber composition contains the low-melting paraffin wax without containing the low-melting fatty acid amide, the amount of the low-melting paraffin wax contained in the rubber composition ranges from 30 to 70 parts by mass per 100 parts by mass of all rubber components.

7. A method for producing a rubber molded body, comprising:

providing a rubber composition; and molding and vulcanizing the rubber composition, thereby obtaining the rubber molded body, wherein the rubber composition comprises: a natural rubber and a butadiene rubber as predominant rubber components; a low-melting paraffin wax having a melting point of 45 to 57° C.; and optionally a low-melting fatty acid amide having a melting point of 35 to 85° C., and wherein the providing comprises:

setting a mass ratio of the natural rubber to the butadiene rubber to be within a range of 80/20 to 10/90;

setting an amount of the low-melting paraffin wax contained in the rubber composition to be within a range of 20 to 70 parts by mass per 100 parts by mass of all rubber components; and setting a total amount of the low-melting paraffin wax and the low-melting fatty acid amide contained in the rubber composition to be within a range of 30 to 100 parts by mass per 100 parts by mass of all rubber components.

* * * * *